United States Patent
Kawashima et al.

(10) Patent No.: US 6,819,712 B2
(45) Date of Patent: Nov. 16, 2004

(54) VIDEO ENCODING APPARATUS AND VIDEO ENCODING METHOD

(75) Inventors: Yuji Kawashima, Tokyo (JP); Atsushi Asano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 09/959,458

(22) PCT Filed: Feb. 28, 2001

(86) PCT No.: PCT/JP01/01514

§ 371 (c)(1),
(2), (4) Date: Oct. 26, 2001

(87) PCT Pub. No.: WO01/63938

PCT Pub. Date: Aug. 30, 2001

(65) Prior Publication Data

US 2002/0186767 A1 Dec. 12, 2002

(30) Foreign Application Priority Data

Feb. 28, 2000 (JP) .................................. 2000-052457

(51) Int. Cl.[7] .............................................. H04N 7/12
(52) U.S. Cl. .............................................. 375/240.03
(58) Field of Search ...................... 375/240.02–240.07, 375/240.12–240.16, 240.18, 240.2, 240.23, 240.26, 240.24; 341/67; 370/471; H04N 7/12

(56) References Cited

U.S. PATENT DOCUMENTS

| | | | | |
|---|---|---|---|---|
| 5,148,271 A | * | 9/1992 | Kato et al. | 375/240.23 |
| 5,299,019 A | * | 3/1994 | Pack et al. | 375/240.13 |
| 5,392,037 A | * | 2/1995 | Kato | 341/67 |
| 5,440,345 A | * | 8/1995 | Shimoda | 375/240.14 |
| 5,537,409 A | * | 7/1996 | Moriyama et al. | 370/471 |
| 5,572,333 A | | 11/1996 | Moriyama et al. | |
| 5,631,644 A | * | 5/1997 | Katata et al. | 341/67 |
| 5,892,884 A | | 4/1999 | Sugiyama et al. | |
| 6,094,455 A | | 7/2000 | Katta | |
| 6,426,772 B1 | * | 7/2002 | Yoneyama et al. | 375/240.03 |
| 6,567,471 B1 | * | 5/2003 | Yoshinari | 375/240.26 |

FOREIGN PATENT DOCUMENTS

| | | |
|---|---|---|
| EP | 0 923 243 A1 | 6/1999 |
| EP | 0 634 867 B1 | 8/1999 |
| EP | 0 966 163 A2 | 12/1999 |
| JP | 6-205393 | 7/1994 |
| JP | 6-350460 | 12/1994 |
| JP | 7-87444 | 3/1995 |
| JP | 8-65683 | 3/1996 |
| JP | 10-155152 | 6/1998 |
| JP | 11-122612 | 4/1999 |
| JP | 11-234671 | 8/1999 |

* cited by examiner

Primary Examiner—Richard Lee
(74) Attorney, Agent, or Firm—Finnegan, Henderson, Farabow, Garrett & Dunner, L.L.P.

(57) ABSTRACT

A picture coding apparatus has a signal processor 10 for generating macro-block information by calculating and quantizing the DCTs of a picture signal of a given unit are calculated for each macro-block MB. This information is input to a syntax generator 12 to generate syntax, which is coded by a variable-length coding processor 13. Quantized DCT coefficients of macro information before coding are counted by a count unit 21, and a code size after coding the macro-block information is counted by a count unit 14. A calculation unit 15 calculates an average code length from the accumulated value of the two code sizes. An estimation unit 14 estimates a generation code size after coding given macro-block information input to the syntax generator 12 on the basis of the average code size. A calculation unit 17 calculates a stuffing size by comparing the estimated generation code size with an actually generated generation code size, and the syntax generator 12 generates syntax on the basis of this stuffing size and macro-block MB information.

12 Claims, 7 Drawing Sheets

VIDEO ENCODING APPARATUS AND VIDEO ENCODING METHOD

TECHNICAL FIELD

The present invention relates to a picture coding apparatus for coding a digital moving image signal and, more particularly, to a picture coding apparatus for stuffing predetermined bits into a signal-processed bitstream upon executing the signal process of a picture signal of, e.g., a digital moving image or the like by a predetermined coding scheme.

BACKGROUND ART

In general, a picture coding apparatus for coding a video signal, i.e., a picture signal, must code the picture signal by a predetermined scheme to segment it into units each having a predetermined code size, and must output bitstreams having this unit. That is, in order to prevent a buffer in a decoding apparatus on the receiving side that receives bitstreams from overflowing or underflowing, an coding apparatus on the output side of bitstreams is required to control the code size of each bitstream. As a general method for preventing overflow, control of quantization parameters, control of coding frames, and the like are available, and the code size is adjusted to a predetermined code size by such control. Also, as a method of preventing underflow, a method of stuffing bits is available. In this method, redundant bits which are removed by a decoding process on the receiving side are inserted to a predetermined position of a bitstream as stuffing. Note that stuffing itself means insertion, and, strictly speaking, insertion of stuffing means insertion of stuffing bits. (A simple expression "insertion of stuffing" may also be used.)

In recent years, MPEG-4 has been proposed as a picture signal coding scheme, and put into practical use. In MPEG-4 specifications, for example, stuffing is performed in respective macro-blocks MB (Macro-Block). (Stuffing in respective macro-blocks MB is called MB stuffing.) MB stuffing can specify a coding method of macro-blocks MB, and that coding method is defined as an MB type. In the MB type, stuffing bits can be repetitively stuffed for as many as needed until an MB type that indicates the presence/absence of an inter (Inter) or intra (Intra) differential quantization scale (DQuant) appears. Note that one unit of stuffing bits is defined to be a 9-bit code sequence.

As described above, stuffing is the method of preventing buffer underflow in the decoding apparatus. Normally, a deficient code size is computed for each macro-block (MB) in a bitstream, and MB stuffing corresponding to that code size is executed. That is, stuffing is executed when a picture signal undergoes a signal process by a predetermined scheme, the signal that has undergone the signal process undergoes variable-length coding, and the generation code size of the signal that has undergone variable-length coding does not reach a predetermined code size. In this stuffing, a deficient code size is computed as the code size to be inserted, and stuffing corresponding to that code size is done.

In order to stuff macro-block MB (MB) into a bitstream after MB information has undergone variable-length coding, a method of stuffing for each macro-block MB that has undergone variable-length coding may be used. For this purpose, a device for stuffing bits must be added before a transmission buffer for transmitting bitstreams. As the device to be added, a buffer for temporarily storing a bitstream having no MB stuffing or a device for indicating an stuffing position to allow stuffing of MB into a bitstream may be used.

In order to stuff MB into a bitstream, a memory serving as a buffer is required, and the consumption power of this apparatus increases. Since a device must be added, the circuit scale and consumption power increase, thus generating a delay in the signal process.

DISCLOSURE OF INVENTION

It is an object of the present invention to provide a picture coding apparatus and picture coding method, which can estimate a stuffing size of data to be coded before variable-length coding, and can code the data to be coded by stuffing.

It is another object of the present invention to provide a picture coding apparatus and picture coding method, which can output a predetermined bitstream without an increase in circuit scale and generation of any delay, since variable-length coding is done after stuffing into data to be coded.

According to the present invention, there is provided a picture coding apparatus which comprises:

signal processing means for generating block information by calculating and quantizing orthogonal transforms of a picture signal of a given unit for each block that forms the picture signal;

integration means for generating integrated information by integrating the block information in accordance with a predetermined scheme; and coding means for performing variable-length coding of each block information of the integrated information, the apparatus further comprising estimation calculation means for calculating stuffing bits to be inserted for each block by estimating a generation code size after variable-length coding, and wherein the integration means inserts the calculated stuffing bits at a predetermined position of the integrated information, and the coding means performs variable-length coding of the block information appended with the stuffing bits.

According to the present invention, in the above invention, there is provided a picture coding apparatus, wherein the estimation calculation means further comprises:

first count means for counting quantized DCT coefficients contained in pre-coding block information output from the signal processing means;

second count means for counting a generation code size of an coded cod sequence output from the coding means;

average code word length calculation means for calculating an average code word length of the block length upon coding the block information on the basis of outputs from the first and second count means; and estimation means for estimating the generation code size upon coding given block information input from the signal processing means to the integration means.

According to the present invention, in the above invention, there is provided a picture coding apparatus, wherein the estimation means estimates the generation code size based on an estimation formula (average code word length)×(total number of quantized DCT coefficients).

Furthermore, according to the present invention, in the above invention, there is provided a picture coding apparatus, wherein the average code word length calculation means calculates the average code word length by (accumulated generation code size)/(accumulated number of quantized DCT coefficients) on the basis of an accumulated generation code size after variable-length coding from the second count means, and the total number of quantized DCT coefficients that pertains to block information in the integrated information from the first count means.

Moreover, according to the present invention, in the above invention, there is provided a picture coding apparatus, wherein the estimation calculation means further comprises:

a stuffing calculation unit for determining a stuffing size by comparing the estimated generation code size and an coding accumulated value obtained by accumulating the code size counted by the second count means.

Also, according to the present invention, there is provided a picture coding method which comprises:

the signal processing step of generating block information by calculating and quantizing orthogonal transforms of a picture signal of a given unit for each block that forms the picture signal;

the integration step of generating integrated information by integrating the block information in accordance with a predetermined scheme; and the coding step of performing variable-length coding of each block information of the integrated information, the method further comprising the estimation calculation step of calculating stuffing bits to be inserted for each block by estimating a generation code size after variable-length coding, and wherein the integration step includes the step of inserting the calculated stuffing bits at a predetermined position of the integrated information, and the coding step includes the step of performing variable-length coding of the block information appended with the stuffing bits.

In the present invention, since new circuits and processes to be added to implement stuffing for preventing buffer underflow in a decoding apparatus can be minimized, consumption power can be suppressed, and real-time processing can be maintained.

BEST MODE FOR CARRYING OUT OF THE INVENTION

A picture coding apparatus according to an embodiment of the present invention will be described hereinafter with reference to the accompanying drawings.

Figure 1:
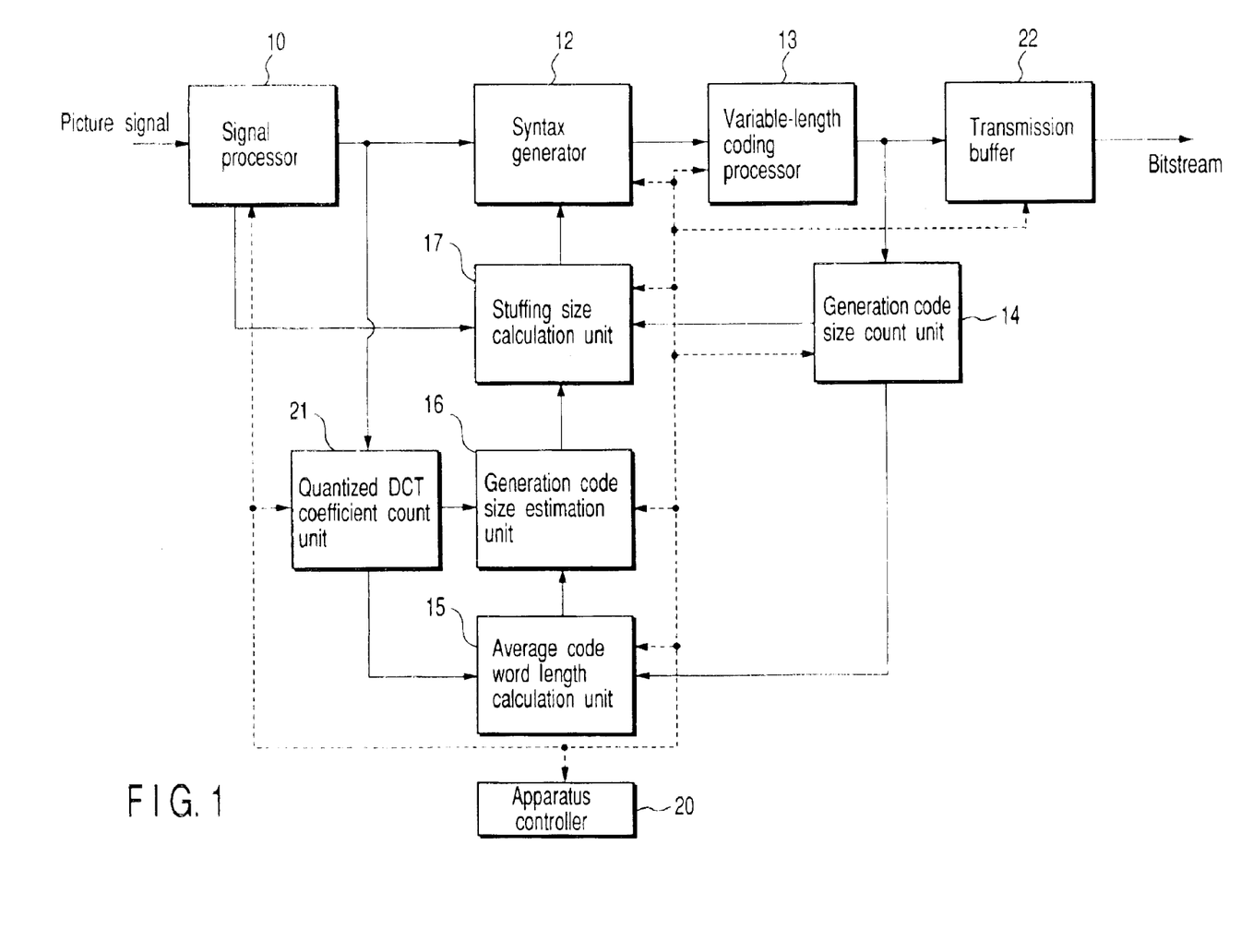
FIG. 1 is a block diagram showing the arrangement of a picture coding apparatus according to an embodiment of the present invention.

FIG. 1 is a block diagram of a picture coding apparatus for executing variable-length coding of a picture signal, i.e., a video signal, according to an embodiment of the present invention. The apparatus shown in FIG. 1 comprises an apparatus controller 20 for controlling respective units in this apparatus, and a signal processor 10 for segmenting a digital picture signal which is input in units of video object planes (VOP), or additionally, in units of frames or fields into predetermined blocks, i.e., macro-blocks MB in accordance with a predetermined picture signal compression scheme (MPEG-4, ITU-T recommendation H.263, or their modified schemes), and compressing the macro-blocks by executing a signal process.

Figure 2:
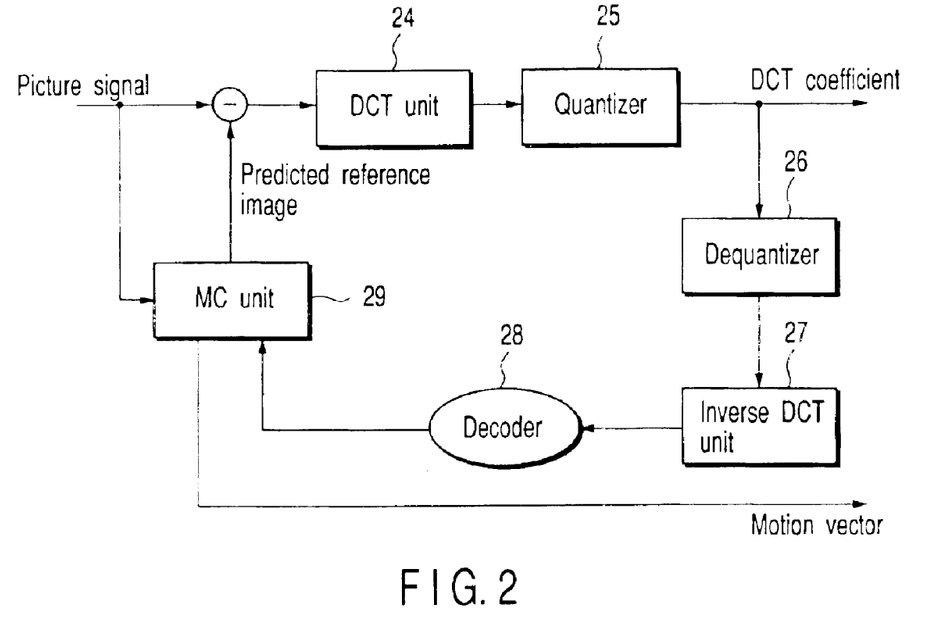
FIG. 2 is a block diagram showing the arrangement of a signal processor 10 shown in FIG. 1.

As shown in FIG. 2, the signal processor 10 comprises a quantized DCT coefficient (Discrete Cosine Transform) unit 24 and quantizer 25. The DCT unit 24 computes the orthogonal transforms, i.e., DCTs of a digital picture signal input under the control of the controller apparatus 20, and the quantizer 25 independently quantizes the obtained DCT coefficients for respective DC (direct current) and AC (alternate current) components. The quantized DCT coefficients are output as texture (quantized DCT coefficients) to a syntax generator 12 shown in FIG. 1.

The signal processor 10 shown in FIG. 2 also comprises a dequantizer 26 for dequantizing a quantized bitstream, an inverse DCT unit 27 for computing the inverse DCTs of dequantized DCT coefficients, and a motion compensation unit, i.e., MC unit 29 for comparison with the next frame in units of macro-blocks MB. In this signal processor 10, the inverse DCTs of DCT coefficients are computed to reclaim a decoded image, as denoted by reference numeral 28, the decoded image is compared by the MC unit 29 with the next input frame or field for the respective macro-blocks MB, and the MC unit 29 outputs a motion vector and a predicted reference image on the basis of their comparison result. The motion vector is output to the syntax generator 12 shown in FIG. 1 as in texture (quantized DCT coefficients). The predicted reference image is compared with the next frame image before DCT, their difference undergoes DCT in the DCT unit 24, the DCT coefficients are quantized, and the quantized DCT coefficients are output to the syntax generator 12 for the respective macro-blocks MB.

The syntax generator 12 generates syntax according to an coding mode based on MPEG-4 specifications on the basis of macro-block MB (MB) information containing the input texture (quantized DCT coefficients) and motion vector, and a stuffing size to be described later, and inputs the syntax to a variable-length coder 13. Note that control of this coding mode is set by the apparatus controller 20.

The syntax output from the syntax generator 12 is sequentially coded by variable-length coding in the variable-length coding processor 13. A bitstream that has undergone variable-length coding is supplied to a transmission buffer 22, which transmits the bitstream in accordance with a target bit rate set by the apparatus controller 10.

The picture coding apparatus shown in FIG. 1 further comprises a quantized DCT (discrete cosine transform) coefficient count unit 21, the variable-length coding processor 13, a generation code size count unit 14, an average code word length calculation unit 15, a generation code size estimation unit 16, and a stuffing size calculation unit 17. Note that the apparatus controller 20 controls these units, and controls a picture signal input to the apparatus to control bitstreams to be output from the apparatus. Note that control of bitstreams includes setting of a target generation code size (target bit rate) or the number of frames (target frame rate), setting of an coding mode such as rate control, error robustness, or the like, and so on.

The output from the variable-length coding processor 13 is supplied to the generation code size count unit 16, which counts the code size, and supplies the count value to the stuffing size calculation unit 17 and average code word length calculation unit 15.

The quantized DCT coefficient count unit 21 counts quantized DCT coefficients contained in MB information generated by the signal processor 10, and supplies the count value to the average code word length calculation unit 15 and generation code size estimation unit 16.

The average code word length calculation unit 15 calculates an average code word length L of the quantized DCT coefficients on the basis of the accumulated number of quantized DCT coefficients counted by the quantized DCT coefficient count unit 21, and the accumulated code size counted by the generation code size count unit 14, and supplies the average code word length L to the code size estimation unit 16. If Csum represents the accumulated generation code size, and Nsum represents the accumulated number of quantized DCT coefficients, the average code word length L is Csum/Nsum. Note that a fixed value may be used as the average code word length in place of a variable value. For example, a fixed value L=8 may be used as the average code word length. The accumulated value corresponds to the total of the generation code size or the number of quantized DCT coefficient from the beginning of input of a given frame until processing of a corresponding macro-block MB in that frame.

Figure 3:
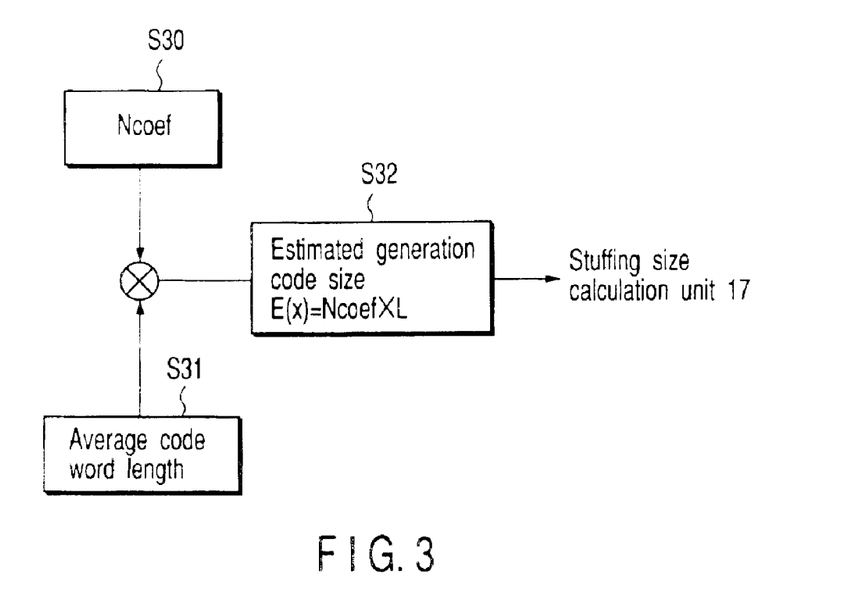
FIG. 3 is a functional block diagram showing the process in a generation code size estimation unit shown in FIG. 1.
Figure 4:
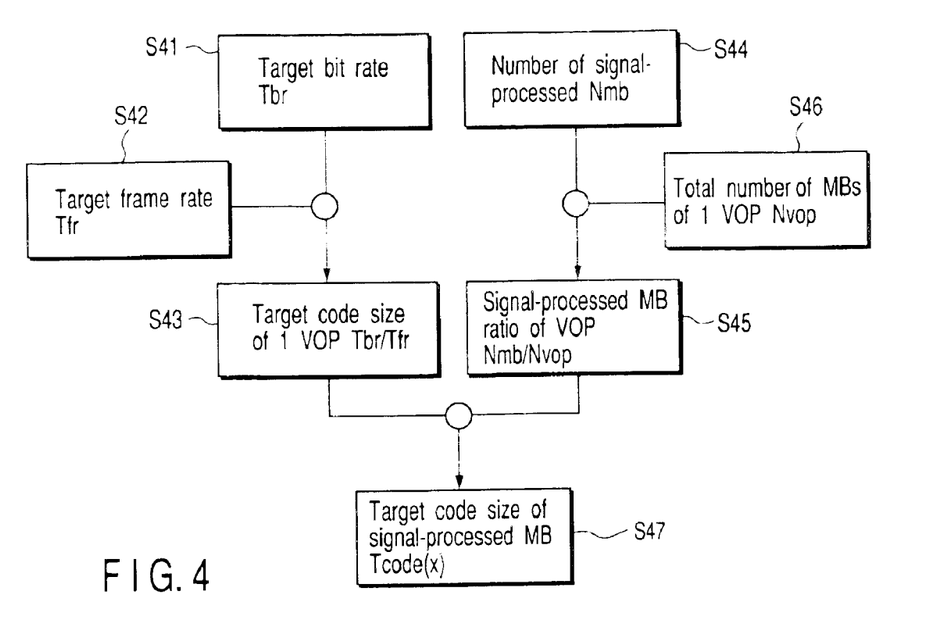
FIG. 4 is a flow chart showing processes for calculating a target generation code size Tcode(x) by a stuffing size calculation unit 17 shown in FIG. 1 on the basis of a target bit rate Tbr, target frame rate Tfr, and the number Nmb(x) of macro-blocks MB (MB) that has undergone a signal process of the signal processor 10.

The generation code size estimation unit 16 calculates an estimated value of a code size which is projected to be generated by the variable-length coding processor 13 for a given macro-block MB on the basis of quantized DCT coefficients Ncoef of that macro-block MB counted by the quantized DCT coefficient count unit 21 and the average code word length L of quantized DCT coefficients calculated by the average code word calculation unit 16, as shown in steps S30 and S31 of FIG. 3. This estimated value is calculated before the variable-length coding processor 13 executes a variable-length coding process of the syntax output from the syntax generator.

An estimated generation code size E(x) is given by:

$$E(x)=Ncoef \times L$$

where x is a positive integer indicating the number of a macro-block MB in a video object plane (VOP), i.e., a frame or field, as illustrated in step S32 of FIG. 3.

The stuffing size calculation unit 17 calculates a target generation code size Tcode(x) on the basis of a target generation code size (target bit rate) Tbr and the number of frames (target frame rate) Tfr, which are set by the apparatus controller 10, and the number Nmb(x) of macro-blocks MB (MB) per frame that has undergone the signal process of the signal processor 11. If Nvop represents the total number of macro-blocks MB (MB) per VOP, which is obtained in advance, the target generation code size Tcode(x) is given by:

$$Tcode\ (x)=(Tbr/Tfr) \times (Nmb(x)/Nvop)$$

where (Tbr/Tfr) is the target bit rate per frame, i.e., the target code size in one video object plane. Also, (Nmb(x)/Nvop) is the ratio of the number of macro-blocks MB which has been signal-processed with respect to the total number of macro-blocks MB in one video object plane. This target generation code size Tcode(x) is defined as a target code size to be cumulatively generated in one video object plane after the x-th macro-block MB which is to undergo a signal process is coded, as can be seen from the above equation.

Using this target generation code size Tcode(x) and a generation code size C(x) of macro-blocks MB that have undergone variable-length coding, which is obtained by the generation code size count unit 14, a target generation code size Tmb(x) of a macro-block MB which is currently coded (to be referred to as an coding MB hereinafter) is calculated by:

$$Tmb(x) = Tcode(x) - \sum_{i=0}^{x-1} C(i)$$

for C(0)=0

A deficient code size S(x) predicted, i.e., estimated from this target generation code size Tmb(x) and the estimated generation code size E(x) obtained by the generation code size estimation unit 16 is calculated as follows.

(1) If the estimated generation code size Tmb(x) is smaller than the target generation code size E(x), we have:

$$S(x)=Tmb(x)-E(x) \text{ if } Tmb(x)>E(x)$$

(2) On the other hand, if the estimated generation code size Tmb(x) is larger than the target generation code size E(x), we have:

$$S(x)=0 \text{ if } Tmb(x) \leq E(x)$$

This S(x) is used as a stuffing size, and is supplied to the syntax generator 2. Note that the stuffing size is defined to be an integer multiple of 9 bits as one unit.

The operation in the picture coding apparatus shown in FIG. 1 will be described below with reference to FIGS. 3 to 8B.

Figure 6:
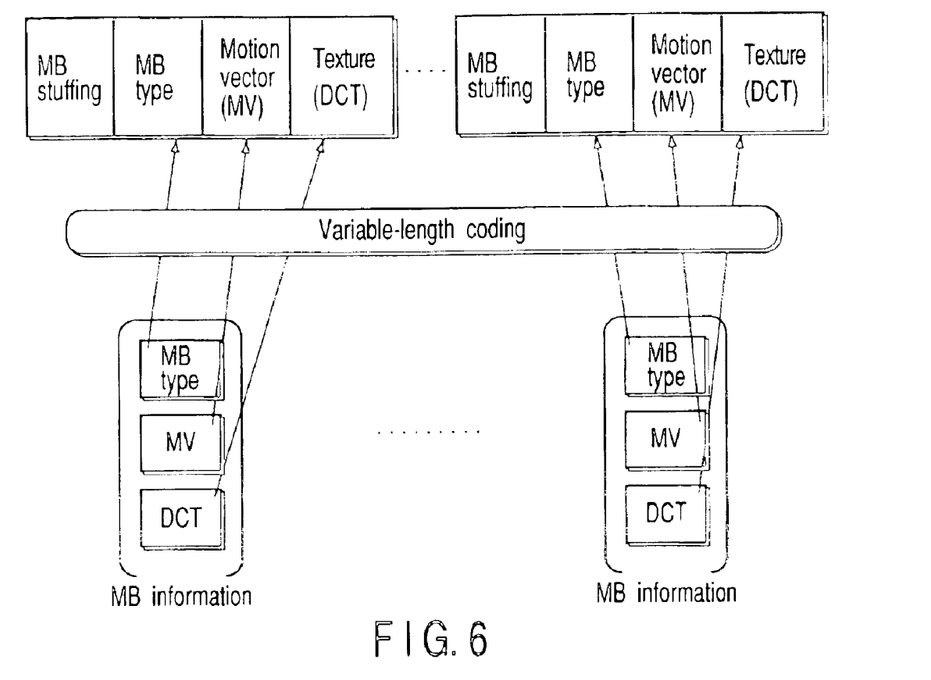
FIG. 6 is an explanatory view showing the processes for converting into a bitstream output from the apparatus shown in FIG. 1 by coding macro-block MB information when stuffing is performed, and the structure of the bitstream that contains data of macro-blocks MB.
Figure 7:
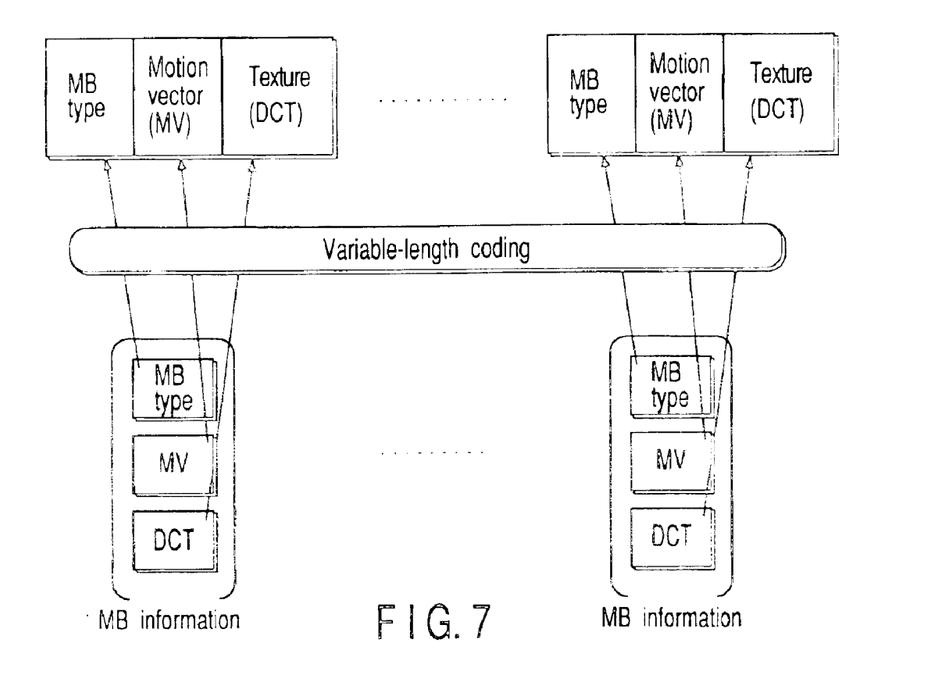
FIG. 7 is an explanatory view showing the processes for converting into a bitstream output from the apparatus shown in FIG. 1 by coding macro-block MB information when stuffing is not performed, and the structure of the bitstream that contains data of macro-blocks MB.
Figure 8A:
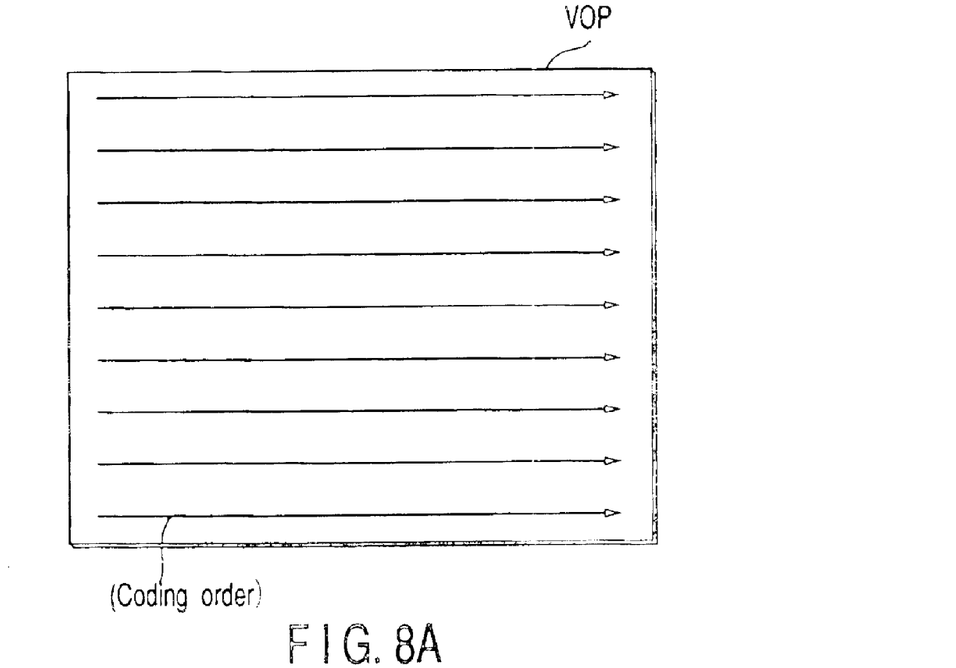
FIGS. 8A and 8B are respectively a plan view for explaining the coding order of video object planes, and a plan view showing the relationship between coded macro-blocks MB and coding macro-blocks MB.

The signal processor 10 sequentially receives an image signal in video object planes, as indicated by arrows shown in FIG. 8A. Upon receiving a picture signal in the signal processor 10, the picture signal undergoes a signal process for the respective macro-blocks MB in the signal processor 10, as shown in FIGS. 6 and 7, thus generating macro-block MB information containing texture (quantized DCT coefficients) and motion vector. The DCT coefficients of the texture (quantized DCT coefficients) are counted by the DCT coefficient count unit 21 to calculate a code size. The accumulated value of the code size counted by the DCT coefficient count unit 21 is supplied as the accumulated number Nsum of quantized DCT coefficients to the average code word length calculation unit 15. The syntax generator 12 generates syntax on the basis of the macro-block MB information, and the syntax undergoes variable-length coding by the variable-length coding processor 13. The code size of the coded bitstream is counted by the generation code size count unit 14, and the accumulated value of the generation code size is similarly supplied to the average code word length calculation unit 15 as the accumulated generation code size Csum. This accumulated generation code size Csum corresponds to the total of the code size generated after variable-length coding of macro-blocks MB in a hatched region in a video object plane shown in FIG. 8B.

The average code word length calculation unit 15 calculates the average code word length L (L=Csum/Nsum) using the input accumulated generation code size Csum and the accumulated number Nsum of quantized DCT coefficients. The average code word length L is supplied to the generation code size estimation unit 16. Since the generation code size estimation unit 16 sequentially receives DCT coefficients Ncoef for respective macro-blocks MB from the quantized DCT coefficient count unit 21, the estimated generation code size E(x) (E(x)=Ncoef×L) is calculated, as shown in FIG. 3.

The estimated generation code size E(x) is supplied to the stuffing size calculation unit 17. The stuffing size calculation unit 17 receives the target bit rate Tbr, target frame rate Tfr, and Nvop as the total number of macro-blocks (MB) per object plane VOP from the apparatus controller 20, as shown in steps S41 and S42 in FIG. 4, and also receives the number Nmb(x) of macro-blocks MB (MB) that have undergone the signal process in one object plane VOP from the signal processor 10, as shown in step S44 and step S46 in FIG. 4. Therefore, a target code size (Tbr/Tfr) in one video object plane is calculated, as shown in step S43, and a signal-processed macro-block MB (MB) ratio (Nmb(x)/Nvop) in one video object plane is calculated, as shown in step S45. As shown in step S47, from this target code size (Tbr/Tfr) and signal-processed macro-block MB (MB) ratio (Nmb(x)/Nvop), the target generation code size Tcode(x) of macro-blocks MB that have undergone the signal process is calculated by:

$$Tcode(x)=(Tbr/Tfr)\times(Nmb(x)/Nvop)$$

This target generation code size Tcode(x) corresponds to the target total code size in a currently coded video object plane VOP, which is generated until the x-th macro-block MB upon coding the x-th macro-block MB by the variable-length coding processor 13.

Figure 5:
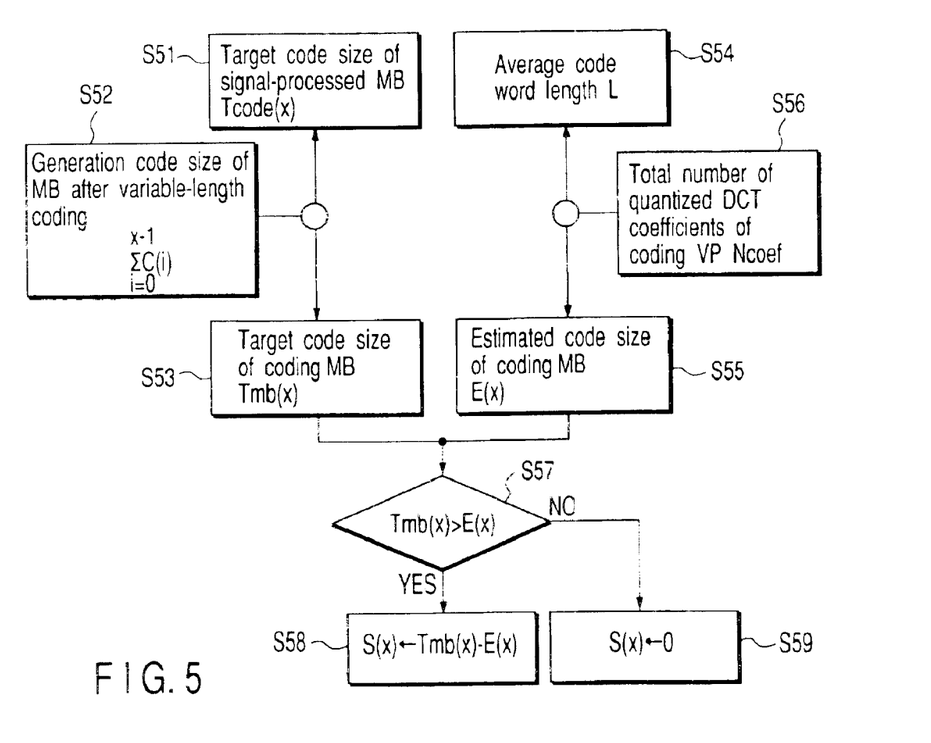
FIG. 5 is a flow chart showing processes for calculating a stuffing size S(x) by the stuffing size calculation unit 17 shown in FIG. 1 on the basis of a generation code size C(x) of macro-blocks MB (MB) that have undergone variable-length coding, which is counted by a generation code size count unit 14 shown in FIG. 1, the target generation code size Tcode(x) obtained by the process shown in FIG. 4, and an estimated generation code size E(x) calculated by the process shown in FIG. 3.
Figure 8B:
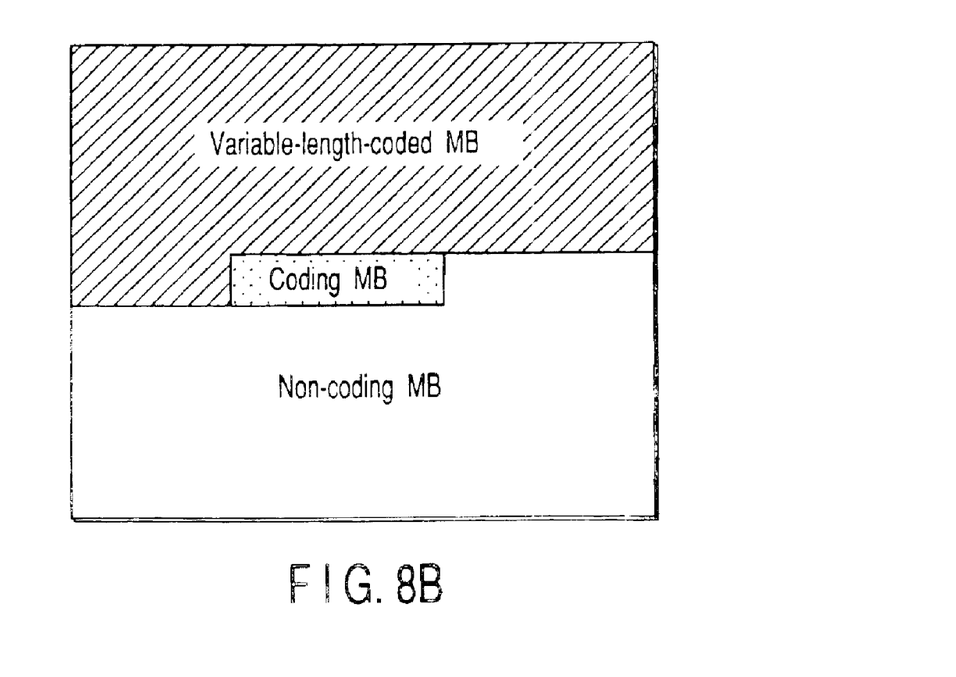

When the target generation code size Tcode(x) is obtained, as shown in step S51 in FIG. 5, it is compared with the generation code size C(x) of macro-blocks MB that have undergone variable-length coding, which is supplied from the generation code size count unit 14, thus obtaining the target generation code size Tmb(x) of the currently coded x-th macro-block MB (MB), as shown by steps S52 and S53 in FIG. 5. This corresponds to their difference, as shown in FIG. 8B.

Also, the estimated code size E(x) of coded macro-blocks is calculated, as shown in step S55, from the average code length L and the total number Ncoef of quantized DCT coefficients of coded macro-blocks MB calculated as shown in steps S54 and S56. As shown in step S57, the generation code size Tmb(x) and estimated code size E(x) are compared. If the estimated generation code size is smaller than the target generation code size, their difference is set as a stuffing size S(x), as shown in step S58. In this case, stuffing is performed as a macro-block MB type (MB type) for each macro-block MB information with reference to that size S(x), as shown in FIG. 6. That macro-block MB information undergoes variable-length coding by the variable-length coding processor in the variable-length coding processor shown in FIG. 1, and is output to the transmission buffer. By contrast, if the estimated generation code size Tmb(x) is larger than the target generation code size E(x), as shown in step S59 macro-block MB information undergoes variable-length coding, as shown in FIG. 7, without inserting any stuffing, as shown in FIG. 7.

FIG. 6 shows the structure of macro-block MB data in which stuffing is performed in a macro-block MB, and FIG. 7 shows the structure of macro-block MB data in which no stuffing is performed in a macro-block MB. In macro-block MB data, a plurality of pieces of variable-length-coded macro-block MB information are successively arranged, and each macro-block MB information is formed by stuffing, a motion vector (MV), and texture (quantized DCT coefficients) in this order, as shown in FIG. 6. By contrast, in the structure shown in FIG. 7, since the need for stuffing is obviated, only a motion vector (MV) and texture (quantized DCT coefficients) are arranged in each macro-block MB information.

After all macro-blocks MB in one object plane have undergone variable-length coding, the quantized DCT coefficient count unit 21 and generation code size count unit 14 are cleared to start the aforementioned process for the next video object plane.

In the above embodiment, the method of stuffing as needed for respective macro-blocks MB (MB) has been explained. However, whether or not stuffing is required need not be determined for all macro-blocks MB (MB) to stuffing bits into a macro-block MB every time stuffing is required. For example, a total coded signal size up to a given timing may be measured, and stuffing may be inserted into only the last sequence or last macro-block MB of a video object plane (VOP) by the aforementioned method.

In the above embodiment, the method of inserting stuffing for respective macro-blocks MB (MB) has been explained. Alternatively, stuffing may be done for respective video packets (VP) specified in MPEG-4. A video packet VP contains at least one of neighboring MBs to be coded together. Upon executing stuffing for respective video packets VP, the generation code size is also estimated for respective video packets VP. When the generation code size is estimated for respective video packets VP, estimation precision slightly lowers, but the number of times of estimation is reduced and the total processing volume is reduced. Hence, such process is effective for real-time processing. Also, this process is particularly effective for coding in a data partitioning mode (to be described later) since variable-length coding is done for respective video packets VP. For example, the MB number x set in the above description is replaced by a VP number x, and the target generation code size Tmb(x) of coding MB is replaced by a target generation code size Tvp(x) of coding VP. All calculations for estimation are the same.

The stuffing method for each VP will be explained below about differences from the method for each MB, i.e., the operations of the generation code size estimation unit 16 and stuffing size calculation unit 17.

Figure 9:
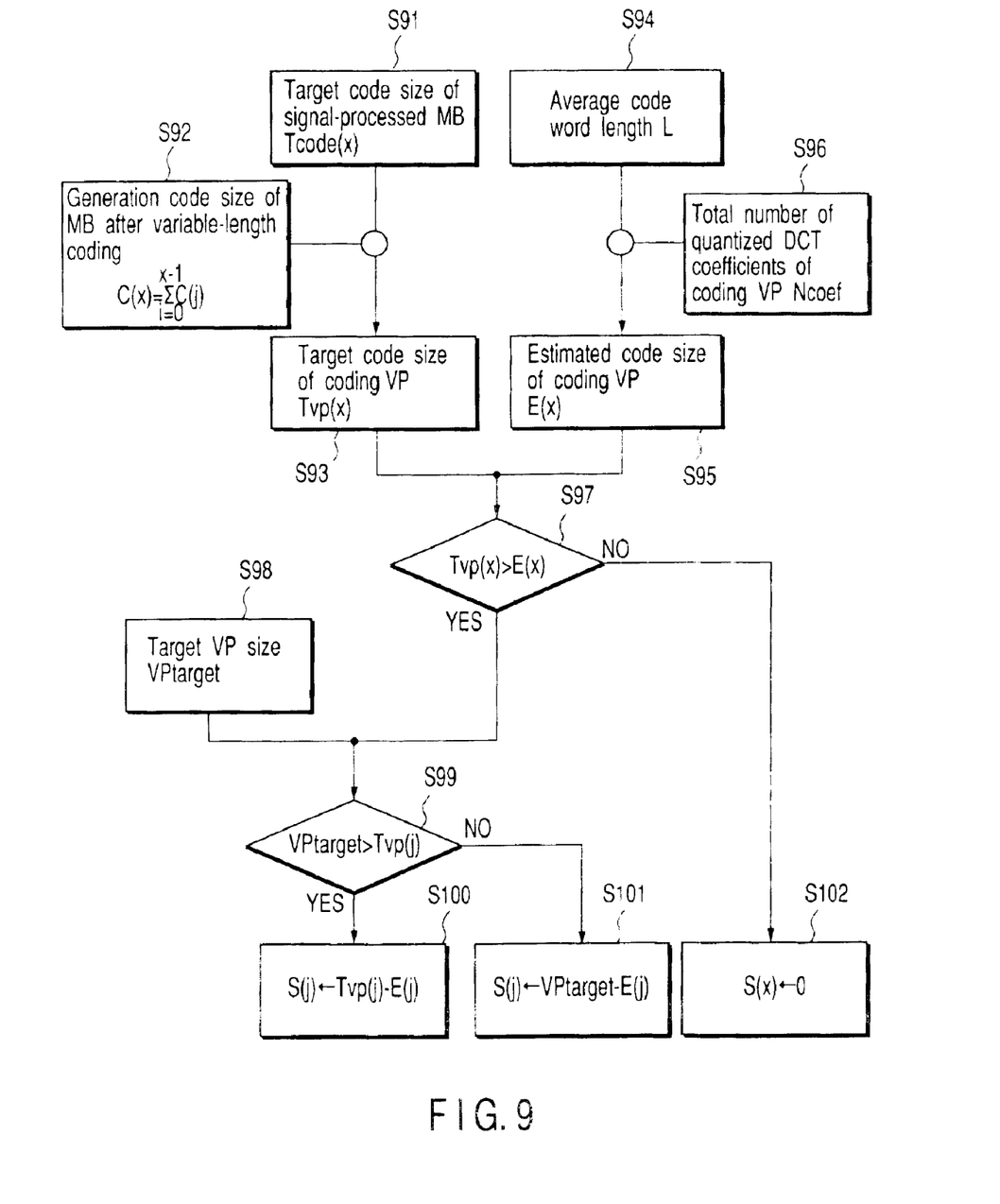
FIG. 9 is a flow chart showing processes for obtaining a stuffing size according to a modification of the present invention, i.e., a flow chart showing processes for calculating a stuffing size S(x) to be inserted into a video packet by the stuffing size calculation unit shown in FIG. 1 on the basis of a generation code size C(x) of macro-blocks MB (MB) that have undergone variable-length coding, which is counted by the generation code size count unit 14, a target code size Tcode(x) of an coding video packet obtained by the same process as that shown in FIG. 4, and an estimated code size E(x) of an coding video packet calculated by the same process as that shown in FIG. 3.

The generation code size estimation unit 16 calculates an estimated value E(x) of a code size to be generated by the variable length coding processor 13 before variable-length coding, as shown in step S95 in FIG. 9, on the basis of a value Ncoef(j) (the total number of quantized DCT coefficients of all macro-blocks MB in a video packet VP) obtained by the quantized DCT coefficient count unit 21 shown in step S96 in FIG. 9, and the average code word length L of quantized DCT coefficients calculated by the average code word length calculation unit 16 shown in step S94 in FIG. 9.

An estimated generation code size E(j) of VP with video packet VP number j is given by:

$$E(j) = Ncoef(j) \times L$$

where j is a positive integer indicating the number of a video packet VP in a video object plane (VOP). x(j) is a positive integer indicating the number of the last macro-block contained in the video packet VP with number j.

The stuffing size calculation unit 17 calculates a target generation code size Tcode(x(j)), as shown in step S91 in FIG. 9, on the basis of the target bit rate Tbr and target frame rate Tfr set by the apparatus controller 20, and the number Nmb(x(j)) of MBs that have undergone the signal process of the signal processor 10. If Nvop represents the total number of macro-blocks MB (MB) per VOP, the target generation code size Tcode(x(j)) is given by:

$$Tcode(x(j)) = (Tbr/Tfr) \times (Nmb(x(j))/Nvop)$$

From this Tcode(x(j)) and a generation code size C(j) of VP that has undergone variable-length coding, which is obtained by the generation code size count unit 14 shown in step S92 in FIG. 9, a target generation code size Tvp(x(j)) of a currently coded video packet VP (to be referred to as a coding VP hereinafter) is calculated by:

$$Tvp(j) = Tcode(x(j)) - \sum_{i=0}^{x(j-1)} C(i)$$

for C(0)=0, as shown in step S93 of FIG. 9.

A deficient code size S(j) predicted, i.e., estimated from this target generation code size Tvp(j) of the coding video packet VP and the estimated generation code size E(j) obtained by the generation code size estimation unit 16 is calculated as follows, as shown in step S97.

If the estimated generation code size is smaller than the target generation code size, we have:

$$S(j) = Tvp(j) - E(j) \text{ if } Tvp(j) > E(j)$$

On the other hand, if the estimated generation code size is larger than the target generation code size, as shown in step S97 and step 102, we have:

$$S(j) = 0 \text{ if } Tvp(j) \leq E(j)$$

This S(j) is used as a stuffing size, and is supplied to the syntax generator 2.

In the picture signal coding scheme MPEG-4, the size of the video packet VP has an upper limit, as shown in step S98. For this reason, if this deficient code size S(j) is inserted as stuffing without any limitations, the upper limit of the size of the video packet VP may be exceeded. Hence, the apparatus controller 20 sets a target size VPtarget (<VPmax) of the video packet VP on the basis of an upper limit value VPmax of the video packet VP. The target size of the video packet VP is set to be a numerical value which is smaller than the upper limit value VPmax of the size of the video packet VP and considers estimation errors, e.g., half the upper limit value, although it depends on the estimation precision of the generation code size, as shown in step S99.

In consideration of these, the stuffing size upon coding for each video packet VP is set so that the sum of the deficient code size S(j) and estimated generation code size E(j) does not exceed the target VP size VPtarget, as shown in step S99. That is, the target generation code size Tvp(j) of coding VP is compared with the target VP size VPtarget, and a value obtained by subtracting the estimated generation code size E(j) of coding VP from a smaller value is set as a stuffing size S(j). This stuffing size S(j) is supplied to the syntax generator 21.

$$S(j) = S(j) \text{ if } Tvp(j) \leq VP\text{target}$$

$$S(j) = VP\text{target} - E(j) \text{ if } Tvp(j) > VP\text{target}, VP\text{target} > E(j)$$

$$S(j) = 0 \text{ if } VP\text{target} < E(j)$$

If the target VP size does not exceed VPtarget, the stuffing size S(j) is determined to be the difference between the target VP size and VP target, as shown in step S101. On the other hand, if the target VP size has exceeded VPtarget, and the estimated generation code size E(j) is smaller than VPtarget, the stuffing size S(j) is determined to be the difference between the target VP size and estimated generation code size E(j), as shown in step S100. Furthermore, if the target VP size has exceeded VPtarget, and the estimated generation code size E(j) is smaller than VPtarget, the stuffing size S(j) is set to be zero which means no stuffing.

The aforementioned method of determining the stuffing size can be similarly applied to the coding method in the data partitioning mode.

Figure 10A:
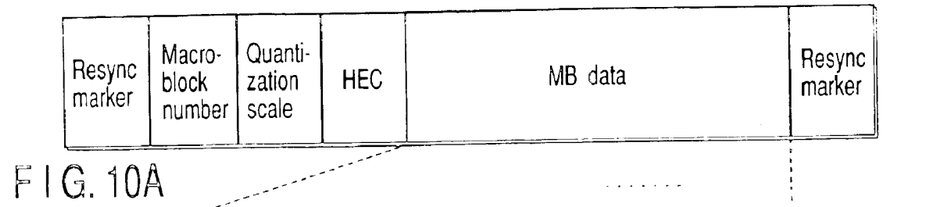
FIGS. 10A, 10B, 10C, and 10D are explanatory views showing the data structure when stuffing is performed into a bitstream of in a data partitioning mode, which is output from the system shown in FIG. 1 according to a modification of the present invention.
Figure 10B:
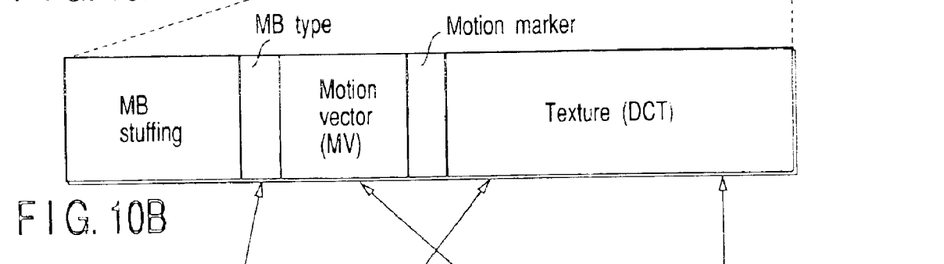
Figure 10C:
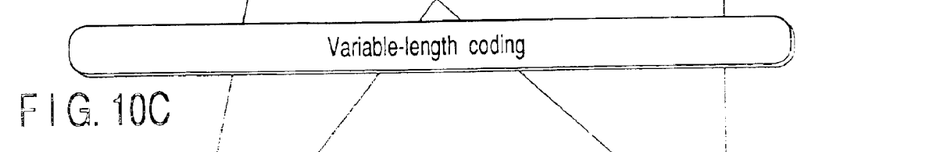
Figure 10D:
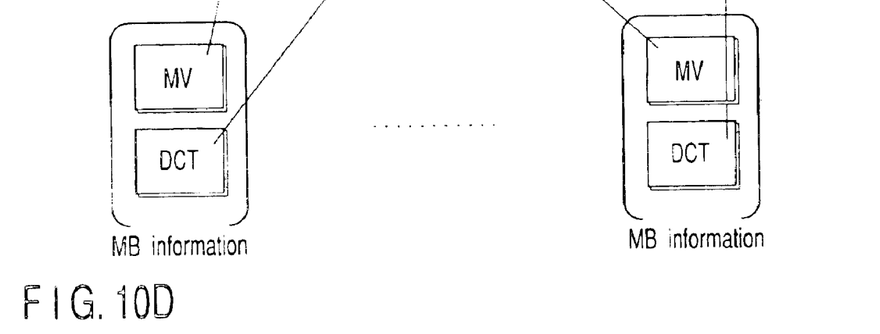

FIGS. 10A to 10D show a bitstream in the data partitioning mode. Coding in the data partitioning mode is a method of executing variable-length coding, as shown in FIG. 10C by integrating macro-block MB (MB) information (motion vector and texture (quantized DCT coefficients) of one or more macro-blocks MB shown in FIG. 10D into:

1. (MB type and motion vector)
2. (texture)

These data 1 and 2 are partitioned by inserting a motion marker, as shown in FIG. 10B. As described above, stuffing bits are inserted at the position of macro-block MB (MB) type. Video packets VP are partitioned by resync markers, as shown in FIG. 10A. Even in the bitstream structure in such data partitioning mode, the code size of MB stuffing shown in FIG. 10B is determined by applying the aforementioned method.

As shown in FIG. 10A, the header of a packet describes the resync marker, macro-block MB number, quantization scale, HEC (Header Extension Code), and the like, and macro-block MB data is arranged after the header.

INDUSTRIAL APPLICABILITY

As described above, according to the present invention, the stuffing size is estimated before variable-length coding, and variable-length coding is done after stuffing. Hence, a predetermined bitstream can be output without increasing the circuit scale or causing any delay. Hence, a problem of a new memory required for reconstructing a bitstream, or a problem of poor real-time processing due to a delay caused by an increase in processing volume can be solved.

What is claimed is:

1. A picture coding apparatus which comprises:

signal processing means for generating block information by calculating and quantizing orthogonal transforms of a picture signal of a given unit for each block that forms the picture signal;

integration means for generating integrated information by integrating the block information in accordance with a predetermined scheme;

coding means for performing variable-length coding of each block information of the integrated information; and estimation calculation means for calculating stuffing bits to be inserted for each block by estimating a generation code size after variable-length coding, wherein said estimation calculation means comprises:
first count means for counting quantized DCT coefficients contained in pre-coding block information output from said signal processing means;
second count means for counting a generation code size of a coded sequence output from said coding means;
average code word length calculation means for calculating an average code word length of a block length upon coding the block information on the basis of outputs from said first and second count means; and
estimation means for estimating the generation code size upon coding given block information input from said signal processing means to said integration means, and wherein said integration means inserts the calculated stuffing bits at a predetermined position of the integrated information, and said coding means performs variable-length coding of the block information appended with the stuffing bits.

2. A picture coding apparatus according to claim 1, wherein said estimation means estimates the generation code size based on an estimation formula (average code word length)×(total number of quantized DCT coefficients).

3. A picture coding apparatus according to claim 1, wherein said average code word length calculation means calculates the average code word length by (accumulated generation code size)/(accumulated number of quantized DCT coefficients) on the basis of an accumulated generation code size after variable-length coding from said second count means, and a total number of quantized DCT coefficients that pertains to block information in the integrated information from said first count means.

4. A picture coding apparatus according to claim 1, wherein said estimation calculation means further comprises:
a stuffing calculation unit for determining a stuffing size by comparing the estimated generation code size and a coding accumulated value obtained by accumulating the code size counted by said second count means.

5. A picture coding apparatus according to claim 1, wherein the stuffing bits are appended for each block information.

6. A picture coding apparatus according to claim 1, wherein the stuffing bits are appended to a set of block information.

7. A picture coding method which comprises:

a signal processing step of generating block information by calculating and quantizing orthogonal transforms of a picture signal of a given unit for each block that forms the picture signal;

an integration step of generating integrated information by integrating the block information in accordance with a predetermined scheme;

a coding step of performing variable-length coding of each block information of the integrated information; and an estimation calculation step of calculating stuffing bits to be inserted for each block by estimating a generation code size after variable-length coding, wherein the estimation calculation step comprises:
a first count step of counting quantized DCT coefficients contained in pre-coding block information output from the signal processing step;
a second count step of counting a generation code size of a coded sequence output from the coding step;
an average code word length calculation step of calculating an average code word length of a block length upon coding the block information on the basis of outputs from the first count step and the second count step; and
an estimation step of estimating the generation code size upon coding given block information input from the signal processing step to the integration step, and wherein the integration step includes a step of inserting the calculated stuffing bits at a predetermined position of the integrated information, and the coding step includes a step of performing variable-length coding of the block information appended with the stuffing bits.

8. A picture coding method according to claim 7, wherein the estimation step includes a step of estimating the generation code size based on an estimation formula (average code word length)×(total number of quantized DCT coefficients).

9. A picture coding method according to claim 7, wherein the average code word length calculation step includes a step of calculating the average code word length by (accumulated generation code size)/(accumulated number of quantized DCT coefficients) on the basis of an accumulated generation code size after variable-length coding in the second count step, and a total number of quantized DCT coefficients that pertains to block information in the integrated information from the first count step.

10. A picture coding method according to claim 7, wherein the estimation calculation step further comprises:
a stuffing calculation step of determining a stuffing size by comparing the estimated generation code size and a coding accumulated value obtained by accumulating the code size counted in the second count step.

11. A picture coding method according to claim 7, wherein the stuffing bits are appended for each block information.

12. A picture coding method according to claim 7, wherein the stuffing bits are appended to a set of block information.

* * * * *